United States Patent [19]

Kuhn et al.

[11] Patent Number: 5,415,479
[45] Date of Patent: May 16, 1995

[54] POSTAL BAR CODE PRINTING WITH ENGRAVED CHARACTER IMPACT PRINTER

[75] Inventors: Robert F. Kuhn, Montrose, Pa.; Ho C. Lee, Endicott; Jack L. Zable, Vestal, both of N.Y.

[73] Assignee: International Business Machines Corporation, Armonk, N.Y.

[21] Appl. No.: 89,931

[22] Filed: Jul. 9, 1993

[51] Int. Cl.6 .............................. B41J 5/00
[52] U.S. Cl. ......................... 400/104; 400/103; 400/146; 101/93.14; 101/401.1
[58] Field of Search .............. 400/103, 104, 145.1, 400/146, 304, 61, 62, 145.2; 101/93.01, 93.13, 93.14, 93.21, 93.04, 401.1; 395/100, 110, 117

[56] References Cited

U.S. PATENT DOCUMENTS

| | | | |
|---|---|---|---|
| 3,656,426 | 4/1972 | Potter | 101/93 C |
| 4,878,771 | 11/1989 | Nishida | 400/103 X |
| 4,967,662 | 11/1990 | Clark et al. | 400/146 X |
| 5,007,748 | 4/1991 | Lee et al. | 400/103 |
| 5,056,429 | 10/1991 | Hirosaki | 400/103 X |
| 5,188,464 | 2/1993 | Aaron | 400/103 |
| 5,326,181 | 7/1994 | Eisner et al. | 400/104 |

FOREIGN PATENT DOCUMENTS

| | | | |
|---|---|---|---|
| 236995 | 11/1964 | Austria . | |
| 56-86758 | 7/1981 | Japan . | |
| 58-114956 | 7/1983 | Japan . | |
| 0197672 | 8/1988 | Japan | 400/103 |

OTHER PUBLICATIONS

IBM Technical Disclosure Bulletin, vol. 29, No. 10, Mar. 1987, "Manufacturing Error Code Scheme".
IBM Technical Disclosure Bulletin, vol. 23, No. 10, Mar. 1981, "Self Identifying Print Belt for Line Printers".
Letter Mail Barcode Update, May 1982.
Automation-Compatible Mail; DMM Issue 43 Jun. 21, 1992.
IBM Technical Disclosure Bulletin; vol. 23, No. 10, Mar. 1981; p. 4739, "Bar-Half Bar Code Pattern".
IBM Technical Disclosure Bulletin; vol. 26, No. 2, Jul. 1983, pp. 766-767, Multi-Tiered Condensed Bar Code.

Primary Examiner—Chris A. Bennett
Attorney, Agent, or Firm—Michael E. Belk

[57] ABSTRACT

An impact printing device for printing postal bar code patterns on an information carrier. The patterns are a combination of parallel tall and short bars separated by spaces. The type elements are attached to a movable type carrier, each element comprised of pairs of vertical bars having different stroke lengths but equal widths. Additionally these elements contain overscored and/or underscored horizontal bars, that when printed appear outside the postal bar code clear space. This produces print elements that have nearly equal area and in turn produce printed characters of uniform stroke widths that are easily read by the U.S. Postal Service electronic readers.

22 Claims, 8 Drawing Sheets

| NUMERIC DIGIT | BAR POSITION |
|---|---|
| 0 | 11000 |
| 1 | 00011 |
| 2 | 00101 |
| 3 | 00110 |
| 4 | 01001 |
| 5 | 01010 |
| 6 | 01100 |
| 7 | 10001 |
| 8 | 10010 |
| 9 | 10100 |

POSTAL BAR CODE PRINTING WITH ENGRAVED CHARACTER IMPACT PRINTER

FIELD OF THE INVENTION

This invention relates to a printer apparatus for printing postal bar code with consistent print stroke width. Particularly to high speed impact line printers using fully formed character print technology.

BACKGROUND OF THE INVENTION

The POSTal Numeric Encoding Technique (POSTNET) was developed by the U.S. Postal Service (USPS) to provide an optimized bar code system for encoding ZIP code information on letter mail. Postnet is a compact bar code format designed to be reliably read and decoded at high speeds by optical reading systems. The basic elements of the printed code are binary digits which are represented as full bars and half bars. Full bars represent "1"s and half bars represent "0"s. Each code character represents a decimal (base ten) numeric digit (0 through 9). The specification for postal bar code is contained in chapter 5 of Automation-Compatible Mail, DMM Issue 43, Jun. 21, 1992, available from the Postal Service, and Letter Mail Barcode Update, May, 1982, available from the Postal Service; both incorporated herein by reference.

Impact line printers comprise a continuously revolving type carrier having fully formed type elements such as alphanumeric characters moving past a row of individually operable print hammers. A control system, which might include a print line buffer for storing a line of data to be printed, a band image buffer which stores an image of the arrangement of the characters on the type carrier along with timing and hammer firing circuitry, selectively operates the hammers in synchronism with the motion of the characters. Imprints of the fully formed characters are produced on a print medium by causing the print medium and the type elements to be impacted against each other as a result of the selective operation of the print hammers while the type carrier is in motion. The print medium is incremented one or more line spaces at the completion of a print line and the process repeated for successive lines of print.

U.S. Pat. No. 3,656,426 by Potter and Austrian patent 236995 disclose line printers which simultaneously print a bar code under their corresponding alphanumeric characters. U.S. Pat. No. 5,056,429 by Hirosaki discloses a thermal printer in which symbol guards are printed around the bar code to prevent wrinkling in the vicinity of the bar code of the thermal transcription ink ribbon and resulting removal of ink. In the embodiment of FIG. 10 of '429 the guard consists of a rectangle surrounding the bar code. In Japanese citation JA 56-86758 to Tagusari smudging of small type area characters (e.g. 1) is decreased by adjusting the radius between the engraved characters and a print band on which they are formed.

Bar codes consisting of a mixture of narrow and wide bars have been successfully printed using impact line printers. In U.S. Pat. No. 5,007,748, narrow bars are placed together on one character and characters with wide bars are produced by overstriking so that the type elements have equal prints surface areas. IBM TDB Vol. 23, No. 10, March, 1981 and IBM TDB Vol. 26, No. 2, July, 1983 disclose multi-length bar codes. Japanese citation JA 58-114956 discloses dots which are separate from each character and which print to indicate when the character becomes worn.

The above citations are incorporated herein by reference.

SUMMARY OF THE INVENTION

It is an object of the invention to provide a high speed line printer which can produce Postnet bar code.

It is another object of the invention to provide a type carrier for a high speed line printer for producing Postnet bar code.

It is another object of the invention to provide a kit to upgrade an existing high speed line printer to produce Postnet bar code.

It is finally an object of the invention to provide a device to operate a high speed line printer having a Postnet type carrier.

A machine non-readable print area is included on the same type element with selected bar-code characters being printed. Specifically, this enlarges the print areas for the type element which reduces the contact time of the hammer impact. Print slur is reduced resulting in significantly narrower stroke widths.

DETAILED DESCRIPTION OF THE DRAWINGS

Figures 1, 2:
FIG. 1 is a table of bar lengths for producing postal bar code in which 0 is represented by a short bar and 1 is represented by a long bar.
FIG. 2 is an enlarged example of standard postal bar code for printing a nine digit zip code.

The table in FIG. 1 describes the postal bar code representation of digits 0 through 9 using 5 character binary numbers where 0 is to be represented by a short vertical bar and 1 is to be represented by a long vertical bar. An enlarged example of standard postal bar code is shown in FIG. 2 for zip code 16273-8495. The bar code is preceded and followed by long frame bars 101, 102 which are not part of the zip code digits. Lines 104,106,108 illustrate the boundaries between the 5 bars that are used to comprise each decimal numeric digit. The last number 110 in the code is a correction character. The full bars are 0.125 inch tall and half bars are 0.050 inch tall. Both types of bars are 0.020" wide and width may deviate only up to 0.005".

The height and width dimension of the bars and pitch (20 to 24 bars per inch) allow Postnet to be printed on fully formed character impact printers. Preferably two bars are printed as one fully formed type element and therefore, four unique type elements can be used for all the combination of short/tall vertical bars required for Postnet printing. This is an optimal combination for line printers.

Thus in FIG. 2 the first printed postal code print element, 121, is a long bar followed by a short bar, the second print element 122, is two short bars, the third print element, 123, is two long bars, the fourth print element, 124, is a short bar followed by a long bar, and the fifth print element is the same as print element 121, (i.e. a long bar followed by a short bar). There are four unique print elements, which when repeated, form the total postal code for the zip code as shown in FIG. 2. The step of creating the sequence of print elements to form the desired postal code must be taken in order to define the print line to be printed.

When the hammers strike the print medium against the moving type belt, the type continues to move relative to the print medium across the medium causing vertical lines of the printed characters to be wider than the vertical lines of the type elements. This phenomena is known in the art as smearing, or slur. For high speed line printers all the hammers are adjusted to impart approximately the same energy, but the amount of energy deviates to a small extent across the bank of hammers and deviates to a small extent for each hammer from one firing to the next.

The energy must be sufficient to produce sufficiently high optical density for the largest area characters. However, for the lowest area characters, this same energy input produces high print contact time which causes increased smearing, wider vertical lines and more deviation in the width of vertical lines. For a given belt speed there is a type bar width that minimizes printed bar width for 2 short bars. If band speed is high, even this minimizing type width will not meet the maximum width requirements for Postnet bar code.

The relatively small size and tolerance in the printed bar widths have prevented using high speed band printers for producing postal bar code labels. The printed area of 2 short bars is approximately 40% of the printed area of the 2 tall bars. Due to the difference in area, the print hammer contact time is substantially more for the short bars and therefore the printed stroke width of the short bars is increased and varied to the extent that the short vertical bar widths no longer meet the USPS stroke width specification.

Alternative solutions to this problem include:
1) Reducing the print band speed to such an extent that the printed stroke width of the short characters consistently meets the specification. Such an approach will slow the printing process and is therefore less desirable.
2) Controlling the energy level of the character being printed to control the contact time and thus the printed stroke width. Such an approach would be conveniently done in impact printers which operate at relatively slow speeds. However, for high speed impact line printers, altering hammer energy levels for individual hammers according to the height of the bars would slow the printing process and introduce considerable complexity into the controls and complicates the flight timing of the hammers which vary with the hammer energy level.

Figure 3:
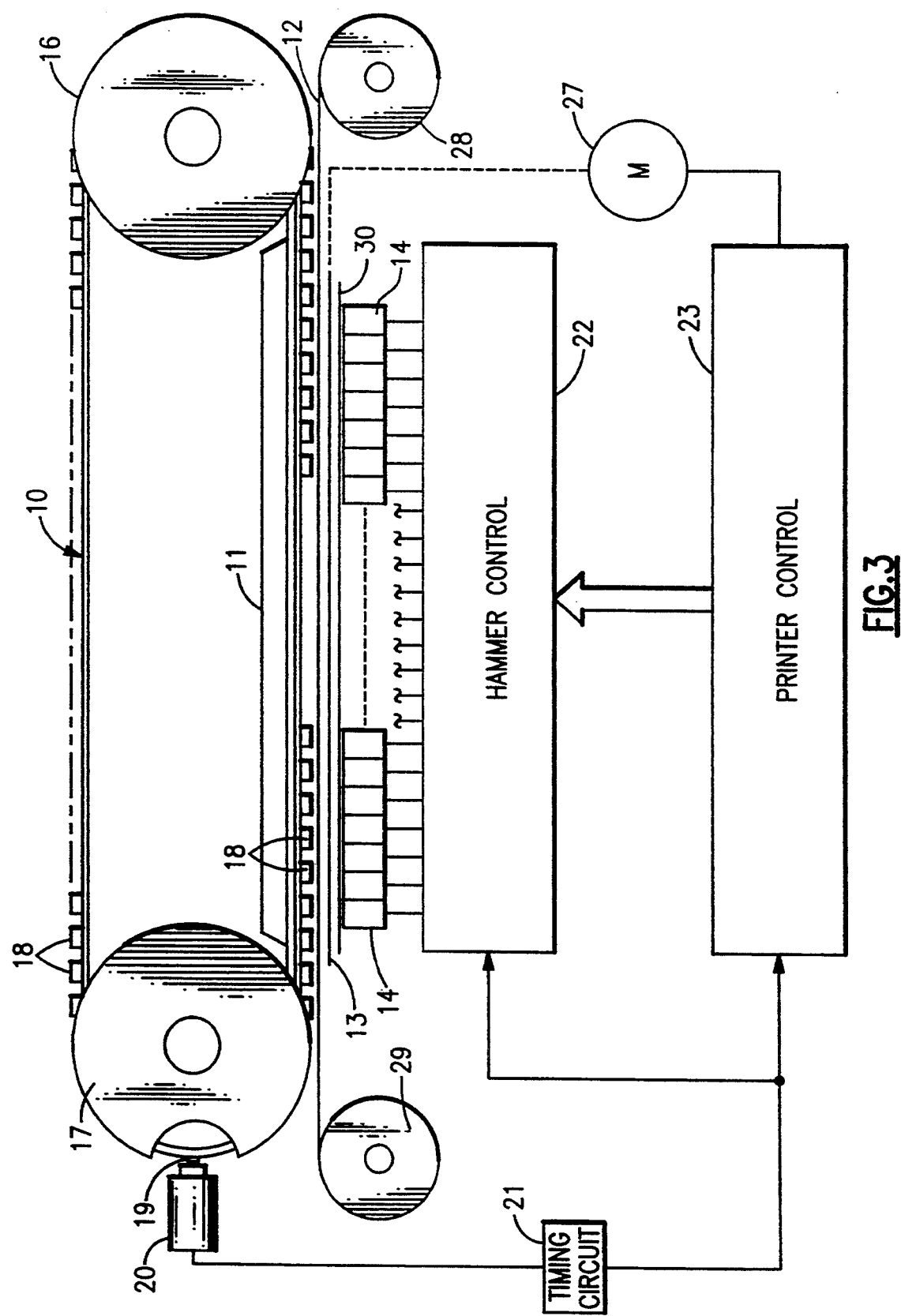
FIG. 3 is a schematic plan view of a high speed printer system for practicing the invention.
Figure 4:
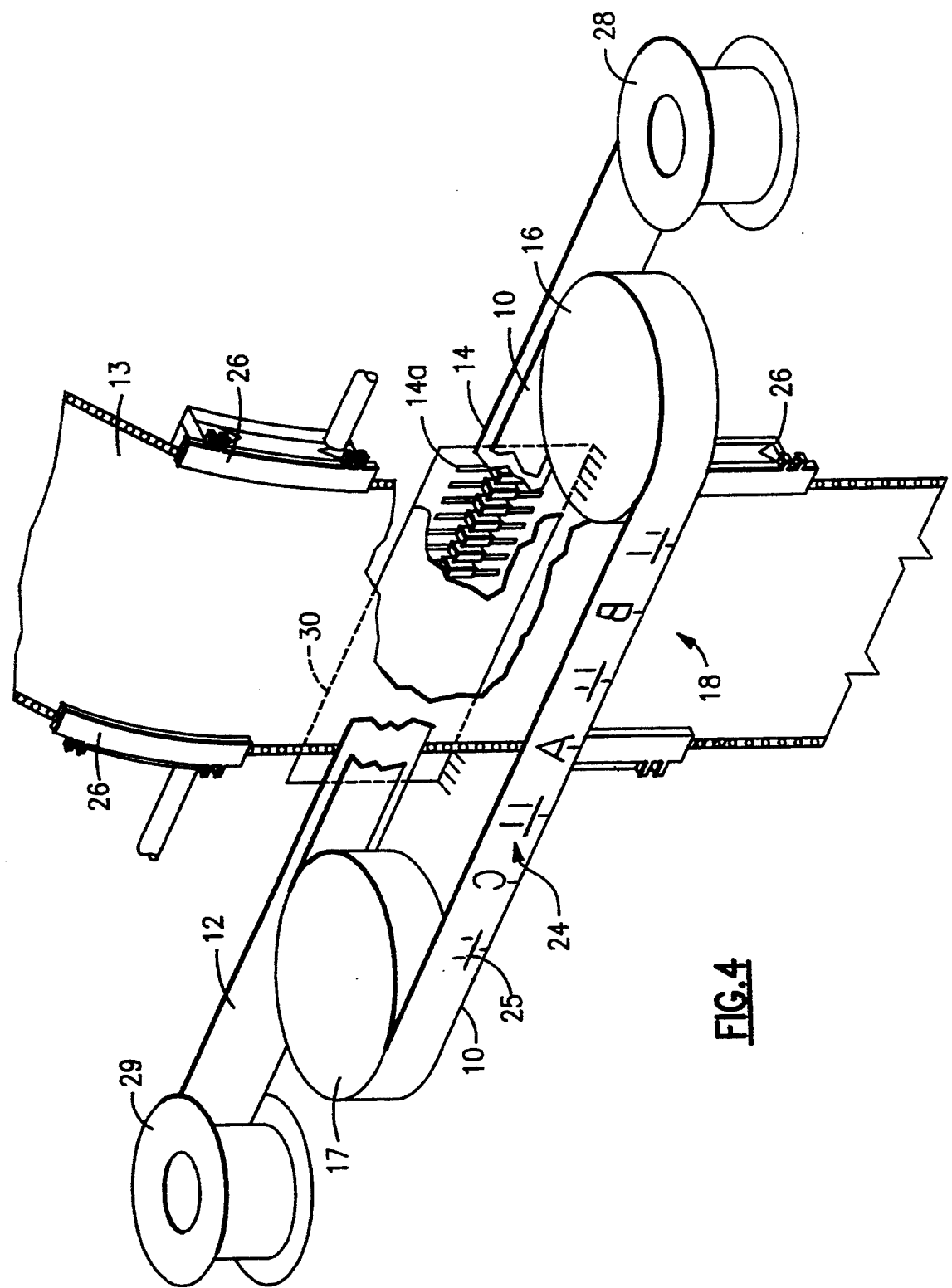
FIG. 4 is an isometric view of a portion of the printer mechanism of the system of FIG. 3 showing an embodiment of the engraved character belt of the invention.

A specific embodiment of the printer mechanism of the invention, shown in FIGS. 3 and 4, comprises a continuous type band 10, platen 11, ink ribbon 12, paper web 13 and electromagnetically operated print hammers 14 mounted on a frame element (not shown) and arranged in a row parallel with the straight portion of type band 10. Type band 10 is supported by a drive pulley 16 and idler pulley 17. A drive motor (not shown) which is connected to the drive pulley operates to move the type band 10 at constant speed during the printing operation. Type band 10, in one form in which the invention may be practiced, has engraved alphanumeric type elements 18, and vertical bar code type elements 24 arranged in a single row around the outer surface of type band 10 as seen most clearly in FIGS. 5 and 6. Additional bars 25 are included as part of at least some of the bar code type elements 24.

Figure 5:
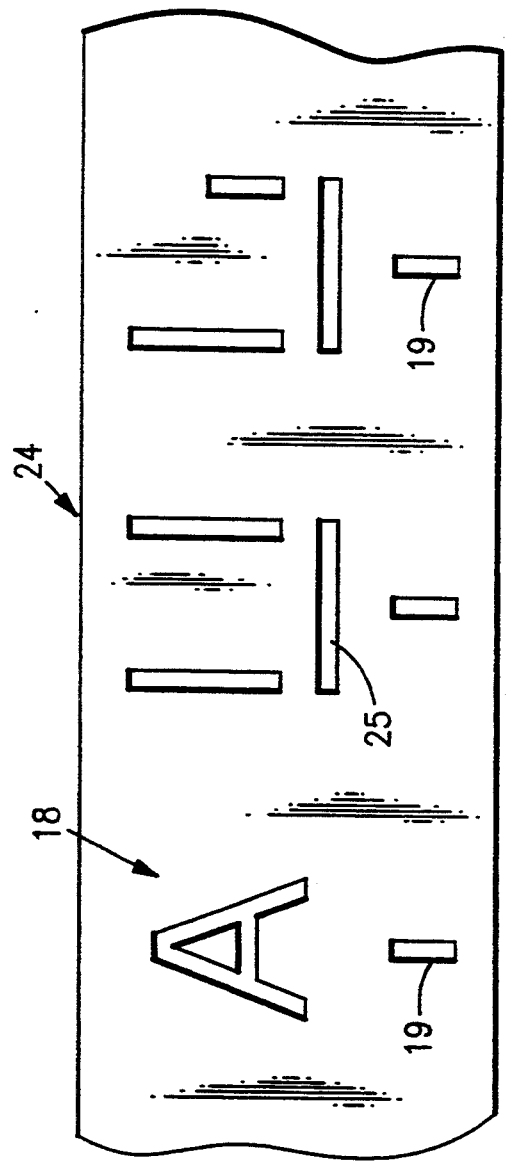
FIG. 5 and FIG. 6 are elevation view showing fragments of the print belt containing the bar code illustrated in FIG. 4.
Figure 6:
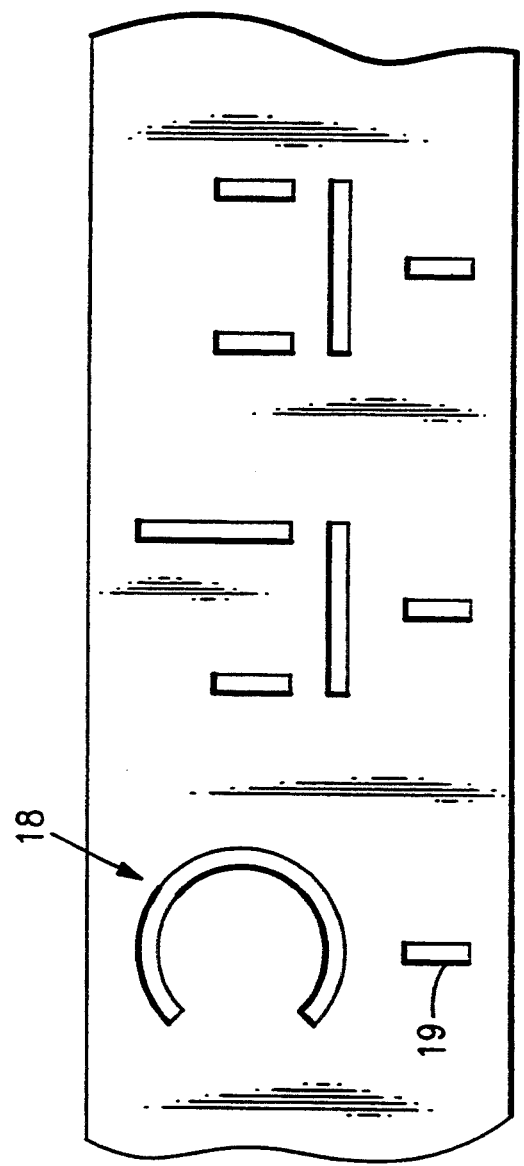

Type band 10 also has timing marks 19 as shown in FIGS. 5 and 6 which are sensed by transducer 20 (see FIG. 3) which, with timing circuit 21, generates print scan pulses to hammer control 22 and printer control 23 which selectively operate print hammers 14 in timed relation with the motion of type elements 18 and 24 on band 10. Timing marks 19 are customarily uniformly spaced except that there may be a missing timing mark or other band identification marks included on the band. Alphanumeric and bar code characters 18 and 24 respectively are typically aligned with the timing marks 19.

Print hammers 14 are arranged facing type element type band 10 with paper web 13, ink ribbon 12 and interposer 30 therebetween. Web 13 may comprise a substrate on which address labels (not shown) are removably attached for the purpose of printing both alphanumeric and bar code imprints. Web 13 is fed in line increments by tractors 26 (see FIG. 4) driven by motor 27 (see FIG. 3) in response to motor drive signals supplied by print control 23. Ink ribbon 12 extends between spools 28 and 29 connected to drive means (not shown) for advancing ribbon 12 in alternate directions. Interposer 30 is a plastic material and is preferably a polymer of the type described in U.S. Pat. No. 4,967,662. Typically interposer 30 is not required for postal bar code printing.

Print hammers 14 are uniformly spaced over the distance which represents the length of the print line of paper web 13. The number of print positions can vary and is typically 132 per print line. The number of hammers 14 can vary depending on the span of the individual hammers. For example, there is a single print hammer 14 as shown in FIG. 3 for each print position. Alternatively, the print hammers 14 can span more than one print position. In either case, the spacing of the print hammers 14 is typically different from the spacing of the type elements on band 10. Consequently during the revolution of type band 10 by pulleys 16 and 17, as is well known, subgroups of type elements align with subgroups of print hammers 14 across the print line in what are commonly called subscan sequence alignments. Such controls are well known in the art and have been used in such printers as the IBM 1403, 4248 and 6262 Printers.

Printer control 23 would include print line and band image buffers (not shown) as well as other operating controls for selectively firing the hammers when characters to be printed are aligned with selected print hammers 14. Such controls are described in further detail in numerous patents including U.S. Pat. No. 4,376,411. In the practice of this invention, print hammers 14 may be fired by printer control 23 more than once in printing a line of bar code. Essentially, print hammers 14 may be controlled by printer control 23 by forming a firing table for each line of print using the print line data stored in the print line buffer and the band image stored in the band image buffer. The process of building hammer firing tables is shown and described in U.S. Pat. No. 4,273,041. An intermediate table to obtain the required postal code print elements needed for printing the desired postal code must first be obtained. The required postal code print elements then become part of print line data.

Figure 7:
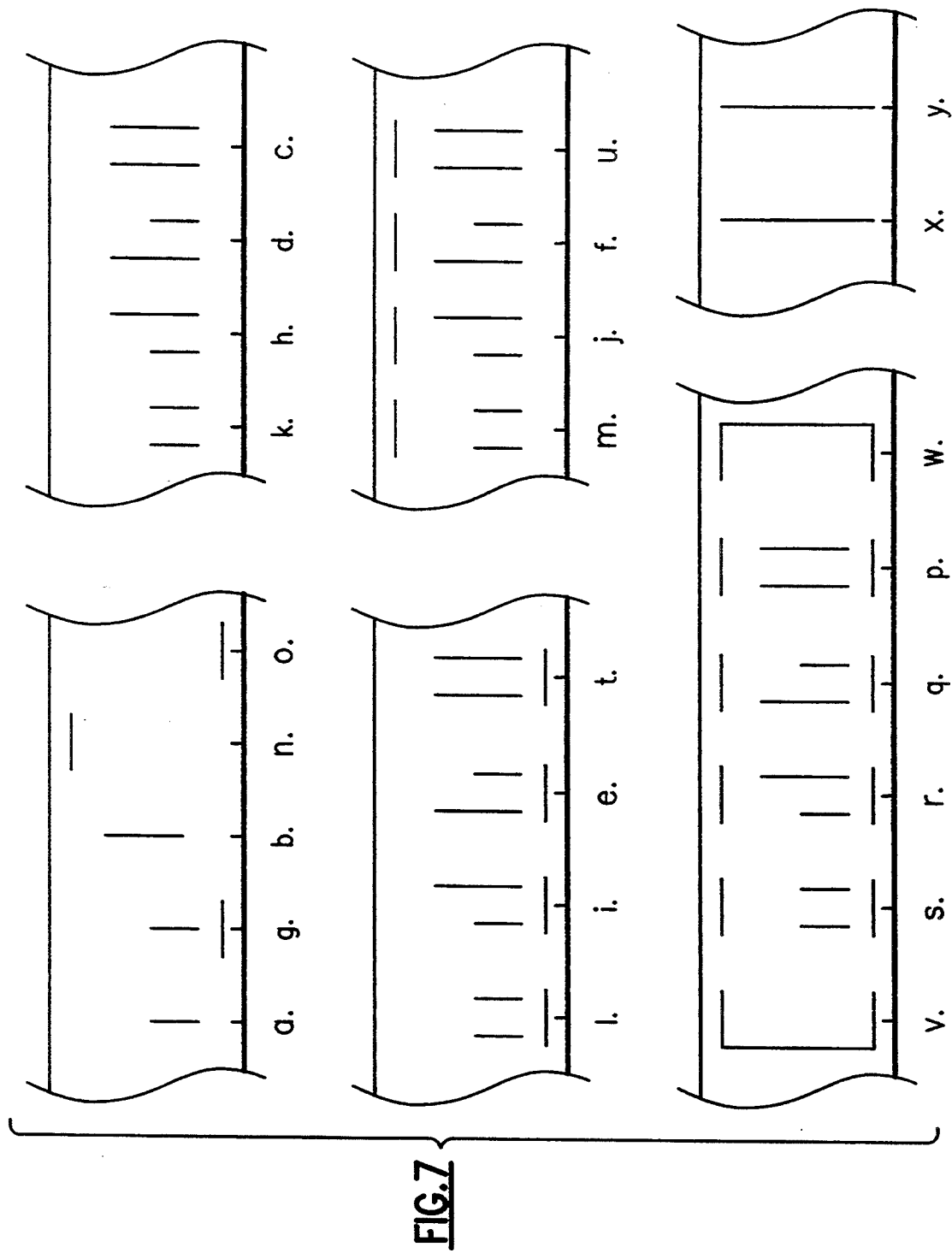
FIG. 7 is a table illustrating various print element embodiments of the postal bar code of the invention in comparison to standard postal bar code of FIG. 2.

The characters in FIG. 7 illustrate various embodiments of the postal bar code print elements. Elements c, d, h and k of FIG. 7 would be the simplest elements for printing postal code on a line printer. It has been found that this is the minimum number of elements required without overstriking. However, the area difference between element c and element k is such that excessive smearing or slur occurs when printing element k, and the USPS stroke width specifications are violated. The set may include single tall bars such as x and y, FIG. 7, which are used at either end of the bar code.

It was discovered that an underscore or overscore could be included on the print band sufficiently far above or below the vertical code bars of the postal code print elements to meet the USPS clear space requirements. Thus the area of postal bar code print elements can be controlled and made effectively equal by including marks that will be printed outside of the postal code clear space. In one specific embodiment of the invention these differences are reduced by utilizing short-short bar characters that contain overscores or underscores, i.e. character 1 or m of FIG. 7. The surface area of elements 1 or m may be selected to closely match that of the long-long bar character, i.e., element c.

Similarly, the tall-short and short-tall print elements can also be altered with a smaller area underscore or overscore than that of short-short elements in order to provide elements e, f, i and j. The area of the underscore or overscore of elements e, f, i and j is smaller than the respective overscore or underscore of elements 1 and m. However, the total surface area of element e, f, i and j is equal to or nearly equal to the total surface area of elements 1 and m.

Figure 8A:
FIG. 8 illustrates various embodiments of the bar code characters of the invention used to produce the various example underscored/overscored bar code embodiments of the invention.
Figure 8B:
Figure 8C:
Figure 8D:
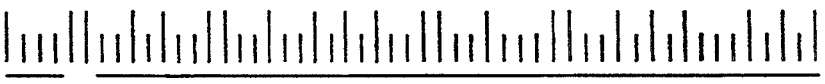
Figure 8E:
Figure 8F:
Figure 8G:

The most preferred embodiment would be to utilize elements t, e, i, and 1 of FIG. 7 with the underscore areas selected to provide nearly equal print area for all these elements. When using these elements the printed postal code will appear as shown in FIG. 8g. When elements c,d,h and 1 are used, then the printed postal code would be as shown in FIG. 8b. In the bar code embodiments of FIGS. 8b, 8c, 8d, and 8e, bar code characters are either consistently underscored or consistently overscored, but the invention contemplates mixing underscoring and overscoring if desired, as in FIG. 8f.

Figure 8H:

In order to improve appearance, all the bar code characters can be consistently underscored or overscored as shown in FIGS. 8g or 8h. This can be done by using single tall bar characters with overscores or underscores (not shown) or tall-tall bar characters with underscores 7t or overscores 7u or by double striking double tall character 7c with a separate underscore or overscore of FIGS. 7n, 7o respectively. Even if tall-tall characters are also underscored and/or overscored, the percentage of difference in surface areas between short-short and tall-tall characters will still be substantially reduced or preferably made equal by choosing the correct overscore or underscore width.

Figure 8I:

Finally, if desired, the entire bar code can be both overscored and underscored to enclose the bar code in a box, as in FIG. 8i. This can be done by producing all the bar code characters with both overscores and underscores as in FIGS. 7p through 7s, or by double striking some bar-code characters (e.g. tall-tall and possibly short-tall and tall-short) with separate overscore and/or underscore characters 7n, 7o respectively and adding the extra side bar characters 7v and 7w respectively at the beginning and end of the postal code. The widths of the underscores and overscores can be selected so the differences in area is sufficiently small to meet Postnet width requirements or more preferably to make the printed areas of all the kinds of elements about equal.

Figure 10:
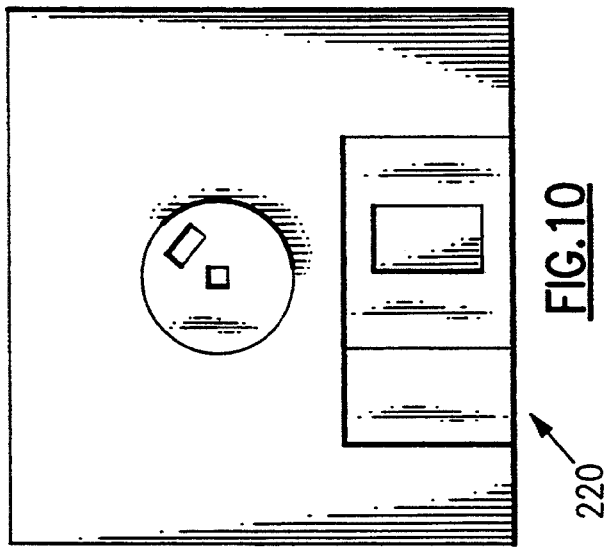
FIG. 10 schematically shows a memory device of the invention for generating signals to operate the printer having the postnet type carrier.
Figure 9:
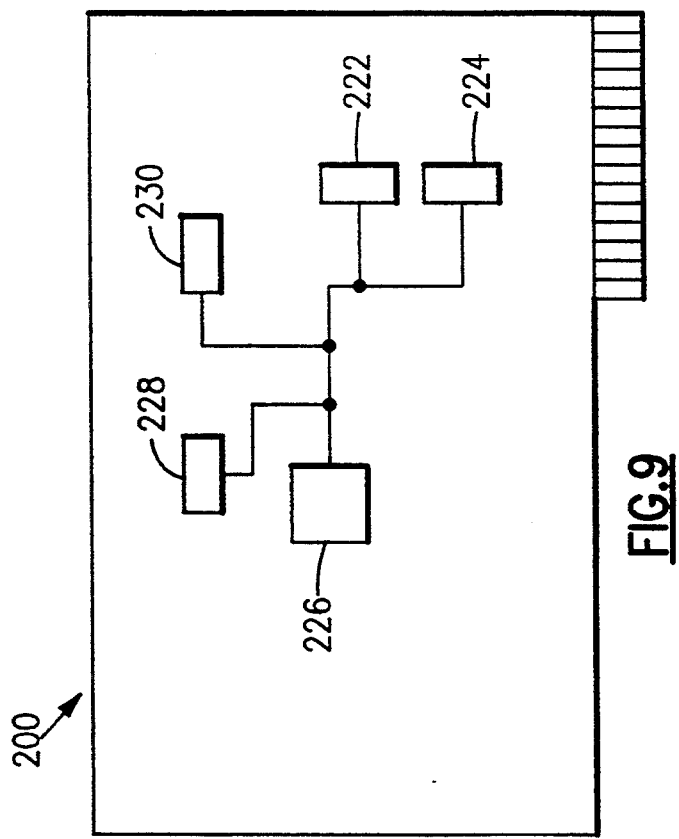
FIG. 9 illustrates a circuit board of the invention for generating signals to operate the printer having the Postnet type carrier.
Figure 11:
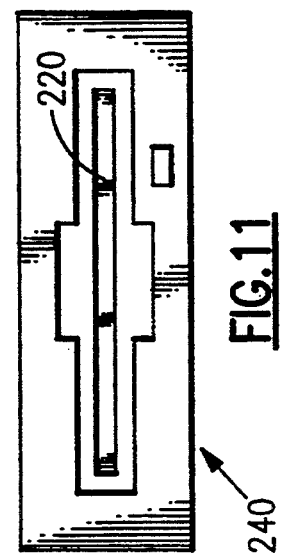
FIG. 11 is a schematic illustration of a reader for cooperating with the disk of FIG. 10 to generate signals to operate the printer having the postnet type carrier.
Figure 12:
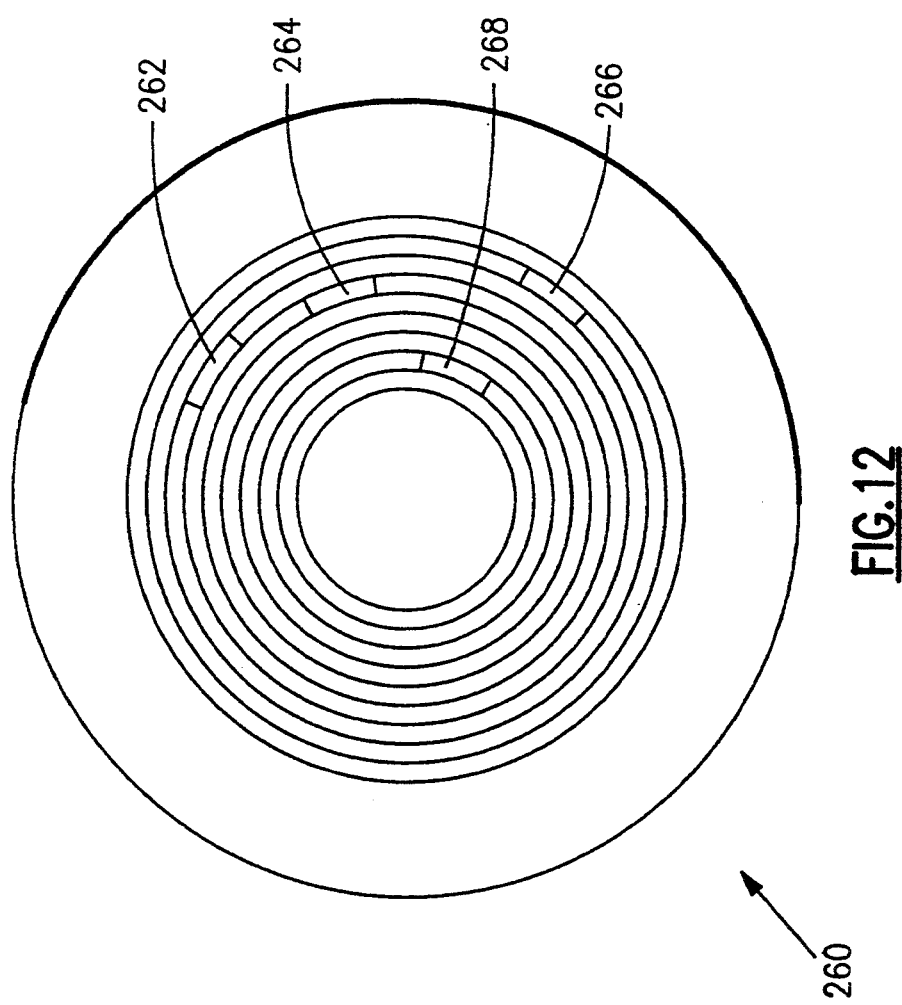
FIG. 12 schematically illustrates a specific embodiment of a magnetic switch device to operate the printer having the postnet type carrier.

The postal bar code can be implemented on a new printer or implemented by supplying a kit for an existing printer. The kit would include a type carrier as previously described and other apparatus (described below) required to produce bar code. These other apparatus can be implemented in hardware such as discrete components on the circuit board 200 shown in FIG. 9; or more preferably in microcode (software) in ROM (read only memory) chips 222, 224 on the circuit board or a replacement or additional ROM chips plugged into an existing circuit board; or more preferably as switches set in an external memory device such as disk 220 in FIG. 10. Circuit board 200 can be supplied as a replacement circuit board for the printer or as an added card such as in a PCMCIA component. The disk in FIG. 10 is preferably a 3.5 inch floppy connected to the printer for transmitting signals to the printer. Such disks are used in cooperation with a reader such as disk drive 240 in FIG. 11 for generating signals used to control a CPU 226 of the printer to print the bar code. Usually the signals generated by the floppy disk are transmitted one time through a connection (not shown), through CPU 226 and temporarily stored in RAM 228 from where they are redirected to the CPU as requested. The other apparatus include means to convert numerical zip code digits to binary code bars. As shown on magnetic disk 260 in FIG. 12 this can be done using an algorithm implemented as magnetic switches set in section 262 and a look-up table implemented as magnetic switches in section 264. Means for dividing the series of code bars into type characters can be implemented as a software algorithm in section 266 of disk 260 which separates the series of bars into pairs and compares the value of the pairs with the values of type characters. The characters are moved into a print buffer 230 in FIG. 9 which is part of the print control 23 of FIG. 3. Typically the disk also contains means to identify the print band to which the algorithms and data apply such as a section 268 of magnetic switches to generate a string of digital signals to identify a print band associated with the disk. The means for converting numerical zip code digits into bar code and means for converting the series of bar code into pairs of bars and means for converting the pairs into bar code type characters are preferably implemented as software loaded from floppy 220 into a host computer (not shown) connected to the printer. Then the host can convert numerical zip code characters into barcode characters to the printer which does not have to convert them. In the preferred embodiment, the operation apparatus are implemented in one floppy disk but could be supplied on several separate floppies or as combinations of one or more cards, replacement ROMs, and floppies.

While the invention has been illustrated with an embodiment having long bars and short bars (i.e. Postal bar code) it would be just as useful for an embodiment with different width bars or other combinations of characters exhibiting different print areas where additional printing outside the read area is acceptable.

While the invention has been particularly shown and described with reference to preferred embodiments, it will be understood by those skilled in the art that various changes of form and details may be made regarding those embodiments without departing from the spirit and scope of the invention.

What is claimed is:

1. A high speed impact line printer, comprising:
   a longate, continuous belt type carrier;
   means for moving the type carrier in its longitudinal direction;
   means for moving printable sheet material into position confronting the type carrier;
   a plurality of bar code type elements on said type carrier for printing a bar code containing a defined minimum clear space, and including a plurality of different kinds of bar code type elements defined by different combinations of high area and low area bars and including one or more kinds of bar code type elements with additional print surfaces for printing outside of the minimum clear space for increasing the total print surface area of kinds of bar code type elements with low area bars so that the ratio of the total print surface areas of the different type elements is more equal;
   a plurality of print hammers for impacting said type elements and imparting approximately constant print energy; and
   means for selectively operating the hammers while said type carrier moves at approximately constant velocity for successively producing the bar code on the sheet material.

2. The impact line printer of claim 1 in which the bar code type elements each include two vertical bars; each of said vertical bars are either a shorter length or a longer length about twice as long as the shorter length.

3. The impact line printer of claim 1 in which kinds of type elements include:
   first type elements with two long vertical bars; and
   second type elements with two short vertical bars and additional print surface for increasing the printed area of the second type elements.

4. The impact line printer of claim 3 in which the additional print surfaces includes a horizontal underscore or overscore.

5. The impact line printer of claim 3 in which the additional print surface including both an underscore and an overscore.

6. The impact line printer of claim 3 in which kinds of type elements further include:

type elements with one short vertical bar followed by one long vertical bar and additional print surfaces; and
   type elements with one long bar followed by one short vertical bar and additional print surfaces;
   and in which the additional print surfaces print marks outside the bar code clear space and the surface area of each kind of type element is about equal.

7. The impact line printer of claim 1 in which each of the additional print surfaces include either an underscore or an overscore.

8. The impact line printer of claim 1 in which all the additional print surfaces include both an underscore and an overscore.

9. The impact line printer of claim 1 in which the printer bar code meet the structural requirements for the Postal Numeric Encoding Technique.

10. The impact line printer of claim 1 in which kinds of print elements include:
    first type elements with two long vertical bars; and
    second type elements with two short vertical bars and additional print surfaces for increasing the printed area of the second type elements sufficient to print satisfactory when struck by print hammers importing about the same energy as imported to the first elements.

11. The impact line printer of claim 1 in which the areas of the type elements are about equal.

12. The impact line printer of claim 10 in which all the elements contain an underscore and an overscore.

13. A type carrier, comprising:
    a longate, continuous belt; and
    a plurality of bar code type elements on said belt for printing a bar code containing a defined minimum clear space, and including a plurality of different kinds of bar code type elements defined by different combinations of high area and low area bars and including one or more kinds of bar code type elements with additional print surfaces for printing outside of the minimum clear space for increasing the total print surface area of kinds of bar code type elements with low area bars so that the total print surface area of the print elements is more equal.

14. The type carrier of claim 10 in which kinds of type elements include:
    elements with two long vertical bars; and
    elements with two short vertical bars and additional print surfaces;
    elements with one short vertical bar followed by one long vertical bar and with additional print surfaces; and
    elements with one long bar followed by one short vertical bar and with additional print surfaces;
    and in which the additional print surfaces print marks outside the bar code clear space and the surface area of each kind of type element is about equal.

15. A kit to upgrade an existing impact line printer to print postal bar code, comprising:
    means to generate signals transmitted to the printer for controlling the printer, including:
    means for identifying a print band;
    means for converting a series of numeric zip code digits into a series of postal bar code bars depending on the print band identification;
    means for converting the series of postal bar code bars into a series of bar code elements; and
    means for transmitting a print band image including bar code elements to the printer for timing the energizing of print hammers to print characters corresponding to the bar code elements depending on the series of zip code digits; and a type carrier, including:

a longate, continuous belt; and a plurality of bar code type elements on said belt for printing a bar code containing a defined minimum clear space, and including a plurality of different kinds of bar code type elements defined by different combinations of high area and low area bars and including one or more kinds of bar code type elements with additional print surfaces for printing outside of the minimum clear space for increasing the total print surface area of kinds of bar code type elements with low area bars so that the total print surface area of the print elements is more equal.

16. The kit of claim 15 in which means for converting numeric zip code digits into bar code bars includes a postal bar code print table.

17. The kit of claim 15 in which the means to generate signals comprises a floppy disk with magnetic switches set to cooperate with a disk drive of the printer to produce the signals.

18. A device to generate signals transmitted to the printer for controlling the printer, comprising:

means for identifying a print band;

means for converting a series of numeric zip code digits into a series of postal bar code bars depending on the print band identification; means for converting the series of postal bar code bars into a series of bar code elements; and means for transmitting print band image including the bar code print elements to the printer for timing the energizing of print hammers to print characters corresponding to the bar code elements depending on the series of numeric zip code digits.

19. The device of claim 18 in which means for converting numeric zip code digits into bar code bars includes a postal bar code print table.

20. The device of claim 18 which comprises a floppy disk with magnetic switches set to cooperate with a disk drive of the printer to produce the signals.

21. A method of printing a bar code, comprising the steps of:

providing a plurality of bar code type elements on a longate, continuous type carrier for printing a bar code which defines a minimum clear space, and including a plurality of different kinds of bar code type elements defined by different combinations of high area and low area bars;

providing additional print surfaces for one or more kinds of the bar code elements with low area bars for printing outside of the minimum clear space for increasing the total print surface area of the bar code type elements so that the total print surface area of different kinds of print elements is more equal;

loading printable material into the printer;

loading the type carrier onto a printer;

connecting means to generate signals to control the printer to the printer;

converting numeric input into a sequence of code bars to be printed;

converting the sequence of code bars to be printed into type elements to be printed;

arranging the type elements to be printed into a buffer in the printer;

moving the type carrier in its longitudinal direction;

moving the printable material into position confronting the type carrier;

selectively operating print hammers to impact against the type elements with approximately constant print energy while said type carrier moves at approximately constant velocity and depending on the contents of the buffer for successively producing the bar code on the sheet material.

22. A method of making a type element carrier, comprising the steps:

engraving a plurality of bar code type elements on a longate, continuous type carrier for printing a bar code containing a defined minimum clear space, and including a plurality of different kinds of bar code type elements defined by different combinations of high area and low area bars; and engraving additional print surfaces for one or more kinds of the bar code elements for printing outside of the minimum clear space for increasing the total print surface area of kinds of bar code type elements with low area bars so that the total print surface area of the print elements is more equal.

* * * * *